Feb. 13, 1934.  A. W. TONDREAU  1,946,600
MAGAZINE FOR MOTION PICTURE FILM
Filed June 27, 1932
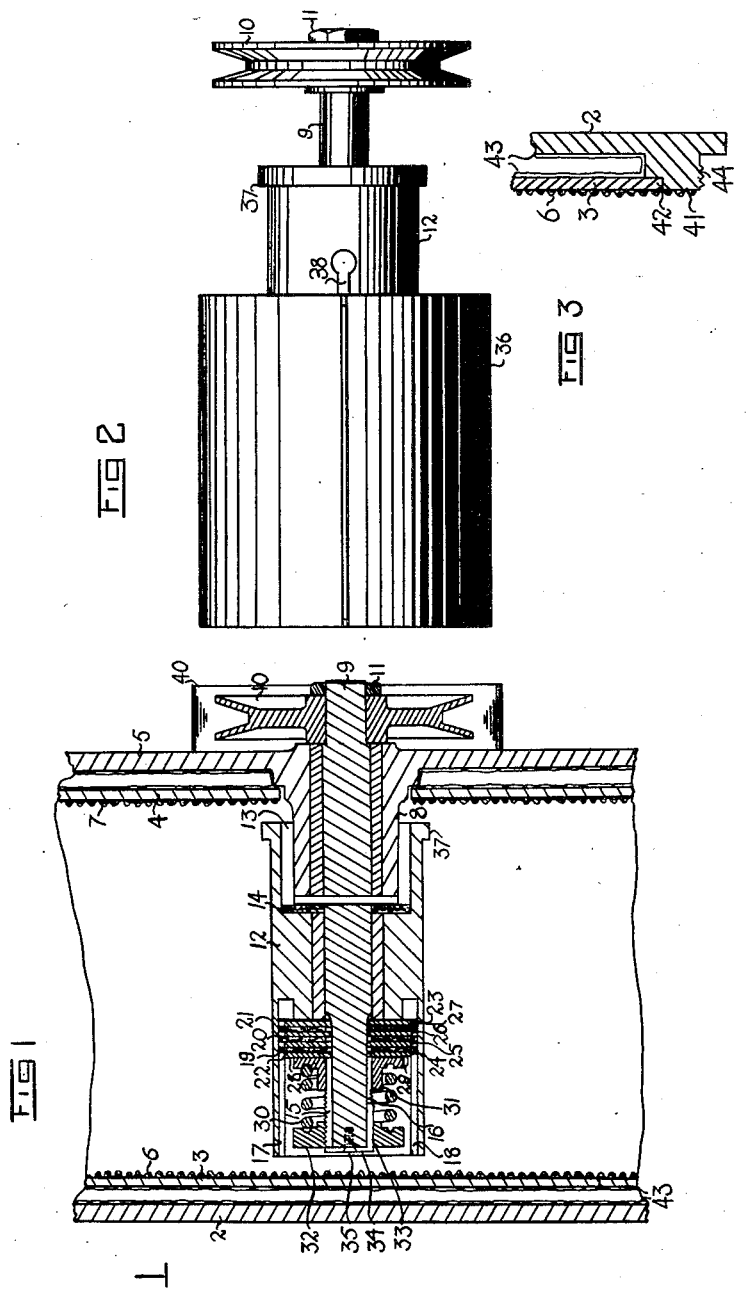
INVENTOR:
ALBERT W. TONDREAU.
BY W E Beatty
ATTORNEY.

Patented Feb. 13, 1934

1,946,600

UNITED STATES PATENT OFFICE 1,946,600

MAGAZINE FOR MOTION PICTURE FILM

Albert W. Tondreau, Hollywood, Calif., assignor to Warner Bros. Pictures, Inc., New York, N. Y., a corporation of Delaware Application June 27, 1932. Serial No. 619,432

4 Claims. (Cl. 242—71)

This invention relates to a motion picture film magazine, and more particularly to a new type of clutch to be used therewith.

When a film has been exposed in a motion picture camera, it is wound onto a spool in a take-up compartment of the magazine. The spool upon which the film is wound is positively driven and a tension must always be kept on the film so that it will not back up and clog the camera. If too much tension is kept on the film, however, it will break, with equally disastrous results, and so a clutch has been introduced into the drive shaft of the take-up magazine in order to insure that tension on the film will be kept constant at any predetermined pressure.

In the past this clutch took the form of a single plate friction clutch which was located outside of the magazine. A large protruding spring was used to maintain the proper tension thereon. A great disadvantage of this type of clutch is that it protrudes out so far from the side wall of the magazine that when the magazine is laid down accidentally or intentionally on its side, the protrusion comes in contact with the ground and the shock of the bump often injures the axle bearing by which the driven shaft is supported. This injury is sometimes so great that the driven shaft cannot be turned at all, with the consequent loss of time and expense in having it fixed.

A second disadvantage that has become noticeable since the introduction of sound pictures is that when the camera is tilted on one side to photograph an unusual effect, or when the film has not been properly loaded in the supply magazine so that the sides of the roll do not run parallel with the sides of the magazine, the film will rub against the side of the magazine with a resultant noise that is undesirable, for making sound pictures.

The present invention overcomes these difficulties by providing a clutch that is located inside the film magazine, so that the axle bearing cannot easily be injured due to the clutch being bumped on the ground. This clutch is mounted between the drive shaft and the shaft upon which the film spool is fitted, thus forming a compact unit that can be easily adjusted for imparting any predetermined tension to the film.

In order to further insure that the bearing will not be damaged, a small, raised, protective guard or railing is mounted around a part of the drive pulley.

The magazine is built with double walls, having some form of sound-deadening material there-between, such as a coating of beeswax, thus making the magazine a fit one to be used with a camera taking sound motion pictures.

For further details of this invention, reference may be had to the accompanying drawing wherein:

Fig. 1 is a view in cross section, showing a part of the magazine and the construction of the clutch and drive shaft of this invention.

Fig. 2 is a side elevation showing the clutch assembly, removed from the magazine, with a film spool partly in place thereon.

Fig. 3 is a view in cross section of the side wall support.

When motion picture film is wound up in the take-up compartment of the magazine after it has been exposed in the camera, it is essential that it is wound up by means of a steady, easy pull and to insure this, the drive shaft of the magazine and the bearing support therefor must be absolutely straight and free running; otherwise, the film will scrape against the side of the magazine or there will be a jerky pull thereon, both of which conditions will tend to break the film. In some cases where the axle bearing is bent, the friction may become so great that the whole mechanism will jam with the result that it must be sent to the repair shop for replacement of the damaged bearing, causing an unwanted delay and sometimes even a loss of valuable film.

The magazine is built with double walls as shown at 2—3 and 4—5 (Fig. 1).

A bearing housing 8 is let into the center of side wall 5. Housing 8 serves to rotatably support a drive shaft 9. A friction pulley 10 is mounted on the end of shaft 9 outside the magazine and held in place by a nut 11. An apertured shaft 12 is supported by shaft 9 and a recessed portion 13 of shaft 12 fits over housing 8. The shafts 9 and 12 are concentric, and a clutch there-between, described below, is contained within shaft 12 and therefore within the film spool 36 carried thereby. A fabric washer plate 14 is placed between the ends of recess 13 and housing 8.

Two similar keyways 15 and 16 are cut directly opposite each other in the outer face of shaft 9 and two corresponding keyways 17 and 18 are cut in the inner face of shaft 12. A series of friction plates 19, 20 and 21, which may be of fabric or bakelite, have lugs such as 22 and 23 which fit into the keyways 17 and 18, fixing the plates 19, 20 and 21 relative to the shaft 12. A series of friction plates 24, 25, 26 and 27, which may be of some metal such as duralumin or chromium so that they will not corrode, are alternately spaced between plates 19, 20 and 21, and have lugs such as 28 and 29 which fit in the keyways 15 and 16, fixing the plates 24, 25, 26 and 27 relative to the shaft 9.

A helical spring 30 surrounds the shaft 9 and presses against a retaining plate 31, which in turn presses against the plate 24. Tension on spring 30 is regulated by a nut 32, screw threaded onto the shaft 9, against which spring 30 presses. The nut 32 is prevented from rotating by an L-shaped key 34 which fits in keyway 16 and a corresponding keyway 33 in the nut 32. Key 34 is held in place by a screw 35 in the head of shaft 9.

Thus, it will be seen that by rotating the nut 32, any desired pressure may be exerted on spring 30, which transmits it in turn to the contacting clutch plates 19, 20, 21, 24, 25, 26 and 27, and through them, to the shaft 12.

A film spool such as 36 (Fig. 2) which may be of the type described and claimed in the co-pending application Ser. No. 611,542, filed May 16, 1932 by Albert W. Tondreau, is driven by the shaft 12 and receives the exposed film. As will be understood, any extra tension thereon will cause the shaft 12 to slip relative to the driven shaft 9 and thus prevent the film from breaking and, at the same time, always maintain an even tension thereon. Spool 36 is held in place by a raised, annular retaining ring 37 upon the shaft 12.

A small pin (not shown) projecting from the inner face of spool 36 is adapted to ride in a keyway 38 cut in the outer face of driven shaft 12 so that the spool and the shaft will rotate together.

A protective railing 40 is mounted on the wall 5 around a part of the driving pulley 10, in order to further protect the bearing housing 8 from being damaged.

Referring to Fig. 3, there is a raised, annular ring 41 on the outer wall 2. Ring 41 has an annular recess 42 which supports the wall 3. A thin coating of beeswax 43 is placed on the inner faces of both walls 2 and 3 and while beeswax 43 is still soft, the two walls are pressed into place together, thus forming an airtight, sound-proof partition. Ring 41 is screw threaded, as shown at 44 in order to mate with a screw thread in the magazine proper, as is well understood. There is an exactly similar arrangement (not shown) for the walls 4 and 5.

The inner walls of the magazine 4 and 5 are covered with some non-actinic material, such as pieces of black corduroy, as shown at 6 and 7.

Thus, it will be seen that a magazine is provided which can be placed on its side for "loading" or "unloading" without fear of damaging the bearing housing, or the walls, as well as a magazine that is absolutely sound proof.

Having thus particularly described the invention, what is claimed as new and desired to secure by Letters Patent is:

1. A motion picture film magazine having a side wall, a bearing housing mounted adjacent said side wall, a driving shaft rotatably supported by said housing, a driven shaft rotated by said driving shaft, a plurality of friction plates, means for fixing a number of said plates relative to said driving shaft, means for fixing a number of said plates relative to said driven shaft and means for varying the frictional presure between said plates.

2. A motion picture film magazine having a side wall, a bearing housing mounted inside said magazine adjacent said side wall, a driving shaft rotatably supported thereby, a pulley mounted on said shaft outside of said magazine, a driven shaft rotated by said driving shaft, a film spool fitted to said driven shaft, a keyway in the inner face of said driven shaft, a keyway in the outer face of said driving shaft, a plurality of friction plates having lugs, a separate lug fitting in each of said keyways and means comprising an adjustable spring for maintaining frictional engagement between said plates.

3. A motion picture film magazine having a side wall, a bearing in said side wall, a driving shaft rotatably supported by said bearing, a pulley outside of said wall on said shaft, a driven shaft having a central bore, said driving shaft being fitted in said bore and thereby supporting said driven shaft, said driving and driven shafts projecting within the film magazine, and a friction clutch within said magazine between said driving and driven shafts.

4. A motion picture film magazine having a side wall, a bearing in said side wall, a driving shaft rotatably supported by said bearing, a pulley outside of said magazine on said driving shaft, said driving shaft projecting beyond said bearing into said magazine, a driven shaft rotatably carried by said driving shaft, said driven shaft having a central bore, a plurality of friction plates within said bore for frictionally coupling said driving shaft to said driven shaft, tensioning means for said plates and means carried by said driving shaft within said bore for varying said tensioning means.

ALBERT W. TONDREAU.